(12) United States Patent
Riege et al.

(10) Patent No.: US 6,322,759 B1
(45) Date of Patent: Nov. 27, 2001

(54) OZONIZER USING A THERMALLY SPRAYED CERAMIC DIELECTRIC

(75) Inventors: Gunter Riege, Wiesbaden; Siegfried Gunther, Eppstein; Rainer Gadow, Aschau am Inn; Andreas Killinger, Leinfelden-Echterdingen; Christian Friedrich, Stuttgart, all of (DE)

(73) Assignee: Schott-Gerate GmbH, Hoffheim (DE)

( * ) Notice: Subject to any disclaimer, the term of this patent is extended or adjusted under 35 U.S.C. 154(b) by 0 days.

(21) Appl. No.: 09/316,811

(22) Filed: May 21, 1999

(30) Foreign Application Priority Data

May 22, 1998 (DE) .............................. 198 22 841

(51) Int. Cl.[7] .............................. B01J 19/08; B01J 19/12
(52) U.S. Cl. .................. 422/186.07; 422/186.18
(58) Field of Search .................. 422/186.04, 186.07, 422/186.18

(56) References Cited

U.S. PATENT DOCUMENTS 4,910,637 * 3/1990 Hanna .............................. 422/186.04
5,407,639 * 4/1995 Watanabe et al. .............. 422/186.07
5,955,038 * 9/1999 Gadow et al. .................. 422/186.07

FOREIGN PATENT DOCUMENTS

| 3424889 | 7/1984 | (DE) . |
| 8630134 | 11/1986 | (DE) . |
| 3830106 | 9/1988 | (DE) . |
| 19511001 | 3/1995 | (DE) . |
| 1242403 | 9/1989 | (JP) . |

* cited by examiner

Primary Examiner—Kathryn Gorgos
Assistant Examiner—Wesley A. Nicolas
(74) Attorney, Agent, or Firm—Oppenheimer, Wolff & Donnelly LLP

(57) ABSTRACT

An ozonizer is disclosed, having a first electrode and a second electrode between which a discharge gap is formed, a dielectric being arranged between the first electrode and the second electrode. The dielectric comprises a support element made of glass or glass ceramic, onto which a thin dielectric film on the order of up to 100 $\mu$m is applied. The use of glass or glass ceramic as the dielectric, in conjunction with an additional thin ceramic dielectric film, allows a considerable improvement in the ozone concentration in the carrier gas, simultaneously with a good ozone yield.

12 Claims, 4 Drawing Sheets

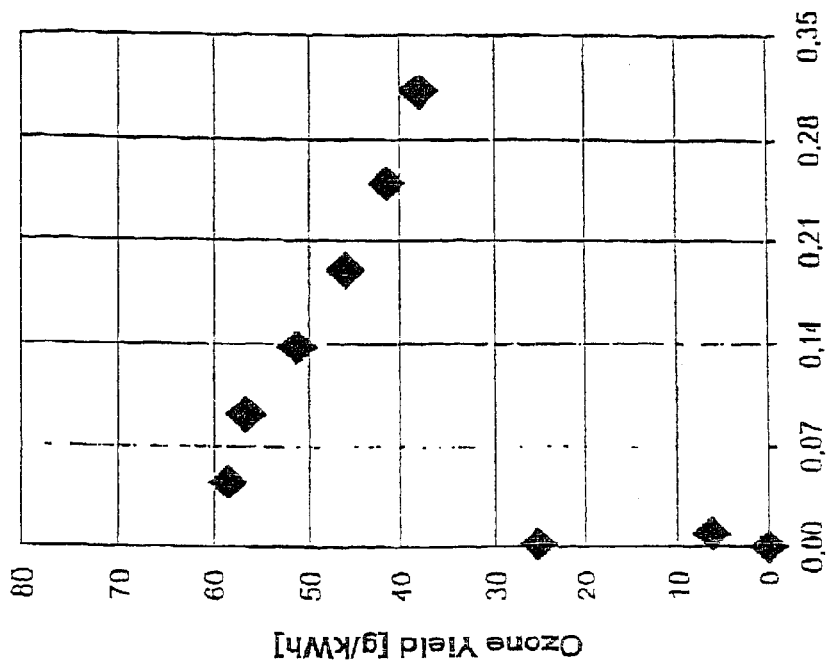
Fig. 3 DURAN® and ZrO₂/Y₂O₃
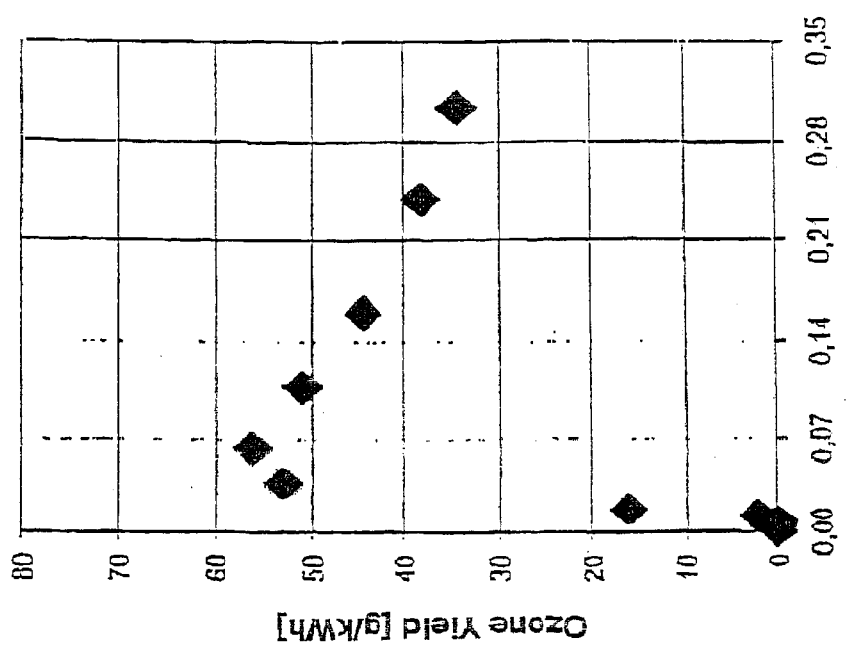
Fig. 2 DURAN® Prior Art

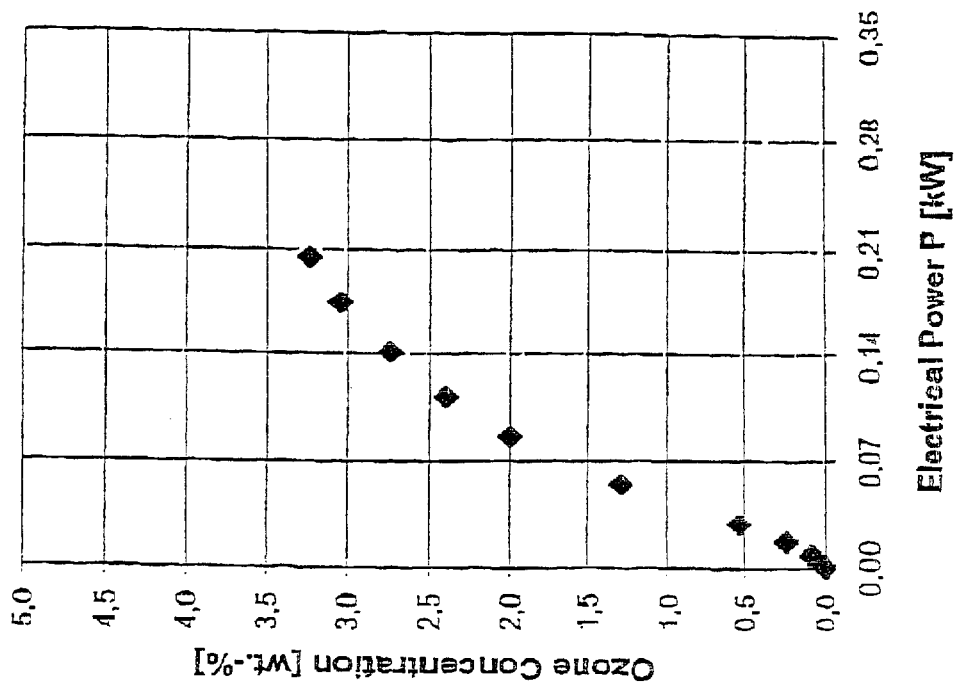
Fig. 7    $Al_2O_3/TiO_2$ 94/6
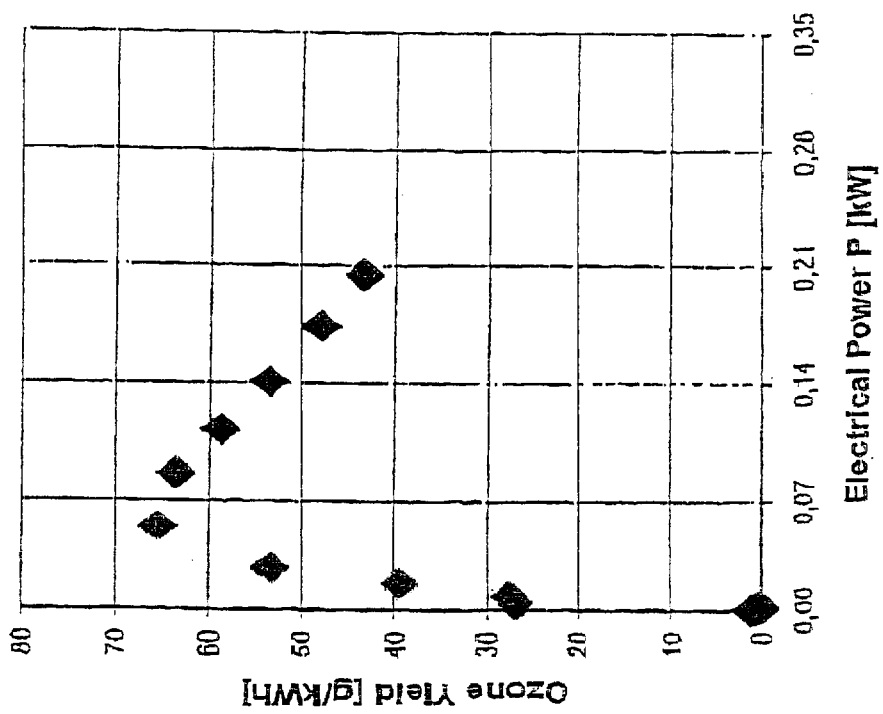
Fig. 6    $Al_2O_3/TiO_2$ 94/6

OZONIZER USING A THERMALLY SPRAYED CERAMIC DIELECTRIC

BACKGROUND OF THE INVENTION

The invention concerns an ozonizer having a first electrode and a second electrode between which a discharge gap is formed, a dielectric being arranged between the first electrode and the second electrode.

The invention moreover concerns a method for the manufacture of an ozonizer.

An ozonizer of this kind is known from DE 195 11 001 A1.

The known ozonizer comprises a, for example, tubular support element made of glass, on the outer side of which a first metallic electrode is applied by thermal spraying. Applied in turn onto this metallic electrode, by thermal spraying, is a dielectric film which can be made, for example, of aluminum oxide, titanium oxide, or hafnium oxide. A discharge gap for ozone generation is provided between the dielectric film and a concentrically arranged outer electrode.

What is used as the dielectric in the known ozonizer is not the glass tube, but only the sprayed-on ceramic film. The glass tube thus serves only as a support element.

A relatively high ozone yield is achieved with this arrangement, since the dielectric is configured only as a relatively thin film and it is known that ozone yield, to a first approximation, is proportional to the dielectric constant and inversely proportional to the thickness of the dielectric. The ozone yield is, at the same time, further increased by the fact that what is used as the dielectric, instead of glass, is aluminum oxide, titanium oxide, hafnium oxide, or a mixture thereof, which results in a higher dielectric constant.

The known ozonizer nevertheless suffers from certain disadvantages. For example, in order for the thermally sprayed dielectric film to have sufficient dielectric strength, it must have a film thickness on the order of approximately 1 mm. Application of a film of this kind by thermal spraying is relatively complex and expensive. In addition, newer ozonizers are usually no longer operated from the standpoint of maximum ozone yield (i.e. mass fraction of ozone generated as a function of electrical energy used), but rather an effort is made to achieve the greatest possible ozone concentration in the oxygen mass flow used as the basis. An effort is thus made, possibly with greater use of electrical energy, to minimize oxygen consumption while generating a predefined quantity of ozone. A high oxygen concentration can only be achieved, however, with higher operating voltages. In the ozonizer known from DE 195 11 001 A1, however, the dielectric strength is relatively limited, since the thermally sprayed dielectric film has a relatively high porosity and is naturally, for cost reasons and for reasons of improved ozone yield, coated only with a film thickness on the order of 1 mm.

As compared to conventional glass ozonizers in which the glass tube is equipped with an inner electrode and the glass tube itself serves as a dielectric, what is achieved according to DE 195 11 001 A1 is thus a higher ozone yield but a lower ozone concentration than with conventional glass ozonizers.

It is thus the object of the invention to create an improved ozonizer which allows the greatest possible ozone concentration to be achieved, simultaneously with a relatively good ozone yield.

SUMMARY OF THE INVENTION

This object is achieved according to the present invention, in an ozonizer of the kind cited initially, in that the dielectric comprises a support element made of glass or glass ceramic onto which a ceramic dielectric film is applied.

The object of the invention is completely achieved in this fashion.

Surprisingly, it has been found that thermal spraying of a thin ceramic film as an additional dielectric film onto the support element made of glass or glass ceramic already results in improved ozone yield. At the same time, the ozonizer according to the present invention makes it possible to achieve both a higher ozone yield as compared to conventional glass ozonizers in which the glass tube serves as a dielectric and which are equipped with an inner electrode, and an improved ozone concentration as compared to ozonizers in which the glass tube serves exclusively as a. support element onto which first the electrode and then a dielectric film is applied.

The ozonizer according to the present invention makes possible improved discharge characteristics as compared to conventional ozonizers. A particularly homogeneous discharge profile is achieved, which is advantageous in terms of achieving a high ozone concentration in the carrier gas simultaneously with a high yield.

It is believed that a certain understoichiometric structure, such as $TiO_{2-x}$ or certain contaminations, both achieved by the thermal spraying process, is necessary to achieve a higher surface conductibility of the dielectric film. This leads to an improved discharge behavior of the microfilaments of the dielectric barrier and thus to a considerably improved ozone yield.

At the same time the ozonizer can be operated at higher voltages, since the dielectric strength is ensured by the support element made of glass or glass ceramic. It is thus possible, with the ozonizer according to the present invention, to attain considerably elevated ozone concentrations in the carrier gas.

In a preferred development of the invention, the first electrode is provided on a first side, facing away from the second electrode, of the support element.

To the extent that the ozonizer is configured as a tube ozonizer, the first electrode is thus provided on the inner side of the support element, while the second electrode is provided on the inner side of a second tube which concentrically surrounds the support element.

According to a further embodiment of the invention, the ceramic film is provided on a second side, facing toward the second electrode, of the support element.

The arrangement of the first electrode on the first side of the support element, and of the ceramic film on the second side, faces toward the second electrode, of the support element, allows easy manufacture by thermal spraying.

In this context, the first electrode can be produced by thermal spraying using an laterally bent lancet that is introduced axially into the glass tube. The ceramic film can then in turn be produced on the outer side of the support element, preferably by plasma spraying.

Since the dielectric strength of the ozonizer is provided by the inherently gas-tight support element made of glass or glass ceramic, which can be manufactured with high precision, the ceramic dielectric film applied on the support element as an additional dielectric film can be configured with a relatively thin film thickness of approximately 10 to 100 $\mu$m, preferably approximately 20 to 70 $\mu$m, in particular approximately 30 to 50 $\mu$m.

A thin dielectric film of this kind can be generated relatively cost-effectively by thermal spraying. At the same time, surprisingly, despite the fact that the additional dielectric film is so thin, an improved ozone yield is achieved as compared to conventional ozonizers in which only a glass tube is used as dielectric and which are equipped with an inner electrode.

According to a further preferred embodiment of the invention, the ceramic film contains at least aluminum oxide, titanium oxide, or zirconium oxide.

In an additional development of this embodiment, the ceramic film contains a mixture of titanium oxide and aluminum oxide which has up to approximately 10 wt % titanium oxide. It has been found in this connection that a concentration of 5 to 10 wt %, preferably on the order of approximately 7 wt % titanium oxide, is particularly advantageous. At higher titanium oxide levels, a large proportion of the titanium oxide is no longer dissolved in the aluminum oxide lattice, which causes the ceramic layer to become conductive so that the necessary dielectric strength can no longer be attained.

According to a further embodiment of the invention, the ceramic film contains zirconium oxide that is stabilized with yttrium oxide, magnesium oxide, or calcium oxide.

It has been found in this context that stabilization in particular with magnesium oxide (up to 28 wt %) and/or with calcium oxide (up to 40 wt %) is particularly advantageous.

According to a further preferred embodiment of the invention, the first and preferably also the second electrode is made of aluminum, an aluminum alloy, titanium, a titanium alloy, or an intermetallic compound of aluminum and nickel.

It is also possible in this context to use an aluminum alloy that contains up to approximately 30 wt % silicon.

The use of these materials, known per se, for production of the first electrode and optionally also of the second electrode makes it possible to achieve good adhesion of the electrode to the glass surface upon application by plasma spraying, at the same time guaranteeing good conductivity and durability in long-term operation.

The support element is preferably made of borosilicate glass or of a glass ceramic.

Both materials can be manufactured with high precision especially in tubular form, both glass and glass ceramic having a higher specific modulus of elasticity than, for example, steel. The result of this is that the tubes deflect only slightly in the usual horizontal arrangement, and thus guarantee that the dimensions of the discharge gap can be maintained more precisely.

The support element made of glass or glass ceramic preferably has a wall thickness of approximately 1.0 to 3.0 mm, in particular approximately 1.5 to 2.1 mm, and in particularly preferred fashion from approximately 1.7 to 1.9 mm.

With this wall thickness for the support element it is possible on the one hand to achieve sufficient mechanical and thermal stability upon application of the metallic film to produce the first electrode, and upon application of the additional dielectric film by thermal spraying. On the other hand, this dimensioning provides a good yield and a high ozone concentration.

As already mentioned above, the ceramic film is preferably configured as a plasma-sprayed film having a thickness of approximately 10 to 100 µm, preferably approximately 20 to 70 µm, in particular approximately 30 to 50 µm.

A film thickness on this order results in a definite improvement in ozone yield, along with a high ozone concentration and nonetheless relatively low manufacturing costs.

The object of the invention is moreover achieved by a method for manufacturing an ozonizer having the following steps:

coating the inner side of a tubular support element, made of glass or glass ceramic, with a metallic film in order to produce a first electrode;

coating the outer side of the support element with a ceramic dielectric film by thermal spraying;

arranging the first electrode and a second electrode at a distance from one another, such that a discharge gap is formed between the ceramic film and the second electrode.

As already mentioned above, it is possible in this fashion, according to the present invention, to manufacture an ozonizer which guarantees a high ozone yield simultaneously with a high ozone concentration during operation.

The coating is preferably applied, both on the inner side of the support element having a metallic film and on the outer side of the support element having a ceramic film, by plasma spraying.

It is thereby possible to apply the ceramic film, in particular, onto the support element in relatively economical fashion and with the necessary electrical discharge behavior. The metallic film on the inner side could alternatively also be produced with other methods, e.g. by electroplating methods.

As also already mentioned, the ceramic film is preferably manufactured from a ceramic material that contains at least aluminum oxide, titanium oxide, or zirconium oxide; in particular, a mixture of aluminum oxide with approximately 7 wt % titanium oxide is preferred, or stabilized zirconium oxide, preferably stabilized with up to 28 wt % magnesium oxide or with up to 40 wt % calcium oxide, is used.

It is understood that the features mentioned above and those yet to be explained below can be used not only in the respective combinations indicated, but also in other combinations or in isolation, without leaving the context of the present invention.

SHORT DESCRIPTION OF THE DRAWINGS

Further features and advantages of the invention are evident from the description below of preferred exemplary embodiments, referring to the drawings in which:

FIG. 2 shows a graphic representation of the ozone yield of a conventional tube ozonizer in which a glass tube made of borosilicate glass, marketed by Schott under the trade name "Duran®," is used as the dielectric, depicted as a function of electrical output;

FIG. 3 shows a graphic representation of the ozone yield as a function of output for an ozonizer according to the present invention, having a tubular support element made of Duran® and having a ceramic dielectric film made of zirconium oxide stabilized with yttrium oxide;

FIG. 6 shows a graphic representation of the ozone yield, as a function of electrical output, that results with a conventional tube ozonizer having a support element made of Duran® glass, onto which is applied an outer electrode onto which a dielectric film of aluminum oxide with 6 wt % titanium oxide is applied, the glass tube not being used as a dielectric; and FIG. 7 shows a graphic representation of the ozone concentration, as a function of electrical output, achievable with the ozonizer according to FIG. 6.

DETAILED DESCRIPTION OF THE PREFERRED EMBODIMENT

Figure 1:
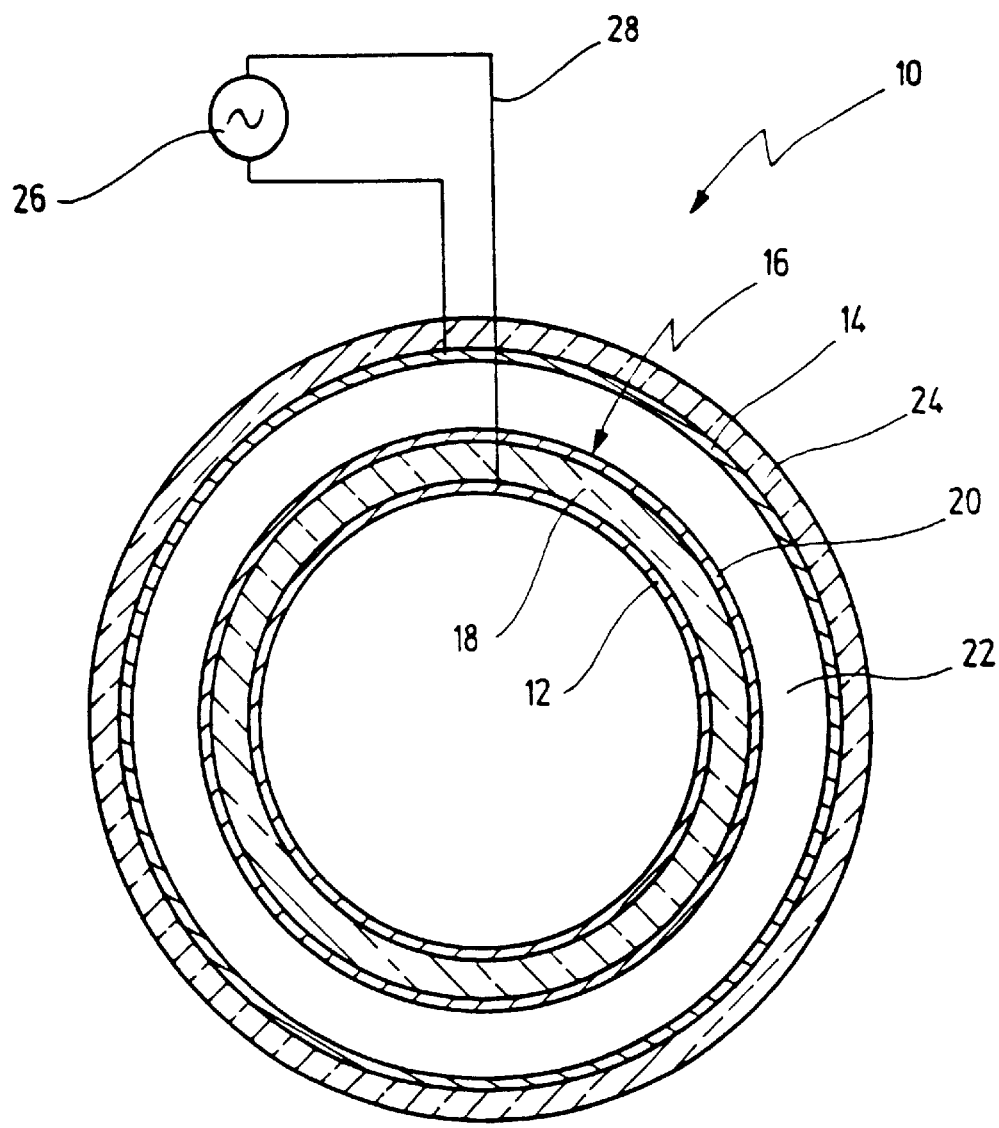
FIG. 1 shows a cross section through an ozonizer according to the present invention in a schematic representation.

The ozonizer according to the present invention is shown in FIG. 1 and designated overall with the number 10.

The ozonizer has two concentrically arranged glass tubes, namely an inner support element 18 made of Duran® glass and an outer support element 24 also made of Duran® glass.

It is understood that the representation is not to scale. The support elements are retained at the ends in suitable receptacles (not shown), and are cooled during operation.

The two support elements 18, 24 have a wall thickness of approximately 1.8 mm. Support element 18 is equipped on its inner side with a first metallic electrode 12 which can be made, for example, of an aluminum-silicon alloy of approximately eutectic composition (approx. 11.7 wt % silicon). In addition, aluminum-titanium alloys, aluminum-nickel alloys, and corresponding intermetallic compounds can be used. Mixed alloys are also possible. First electrode 12 was produced by plasma spraying, for which purpose a bent plasma lancet was introduced axially into the support element.

On the outer side of support element 18, a ceramic dielectric film 20, which can be made of aluminum oxide, titanium oxide, zirconium oxide, or mixtures thereof, is applied also by plasma spraying. The ceramic film can be made, for example, of stabilized zirconium oxide that is stabilized with approximately 10 wt % yttrium oxide. Although zirconium oxide stabilized with yttrium oxide is widely available commercially, this material is relatively expensive. It is preferred instead to use zirconium oxide stabilized with calcium oxide or with magnesium oxide.

In addition, mixtures of aluminum oxide and titanium oxide are also preferred, especially those which contain up to 10 wt % titanium oxide, preferably approximately 7 wt % titanium oxide.

The film thickness of ceramic film 20 is preferably approximately 30 to 50 µm, in particular approximately 40 µm.

Outer support element 24, which is also made of Duran® glass, is equipped on its inner surface with a second electrode 14 that is made, for example, of pure aluminum or can again be made of an aluminum alloy of the kind explained above. An annular discharge gap 22 is formed between ceramic film 20 and second electrode 14.

First electrode 12 and second electrode 14 are connected via conductors 28 to an AC voltage source 26 of approximately 50 to 60 Hz, or higher frequency if a frequency converter is used.

As a result of the outer coating of support element 18 with ceramic film 20, there is arranged between the inner first electrode 12 and the outer second electrode 14 a dielectric, labeled as a whole with the number 16, that is formed from the combination of support element 18 and ceramic film 20.

With an ozonizer of this kind according to the present invention, it is possible to achieve a yield that is improved as compared to conventional tube ozonizers made of glass with an inner electrode and glass as the dielectric, simultaneously with elevated ozone concentration. The yield is somewhat lower as compared to differently constructed conventional ozonizers in which the glass tube serves exclusively as a support element onto which the first electrode is externally applied and onto which in turn the dielectric is applied, but the ozone concentration with the ozonizer according to the present invention is much higher, as will be explained below with reference to FIGS. 2 through 7.

FIG. 3 shows the yield of an ozonizer according to the present invention as a function of the output delivered to it. A comparison with FIG. 2, which shows the yield of a conventional ozonizer having an inner electrode and a Duran® tube as the dielectric, indicates that the ozone yield is improved by approximately 10 to 15%.

Figure 5:
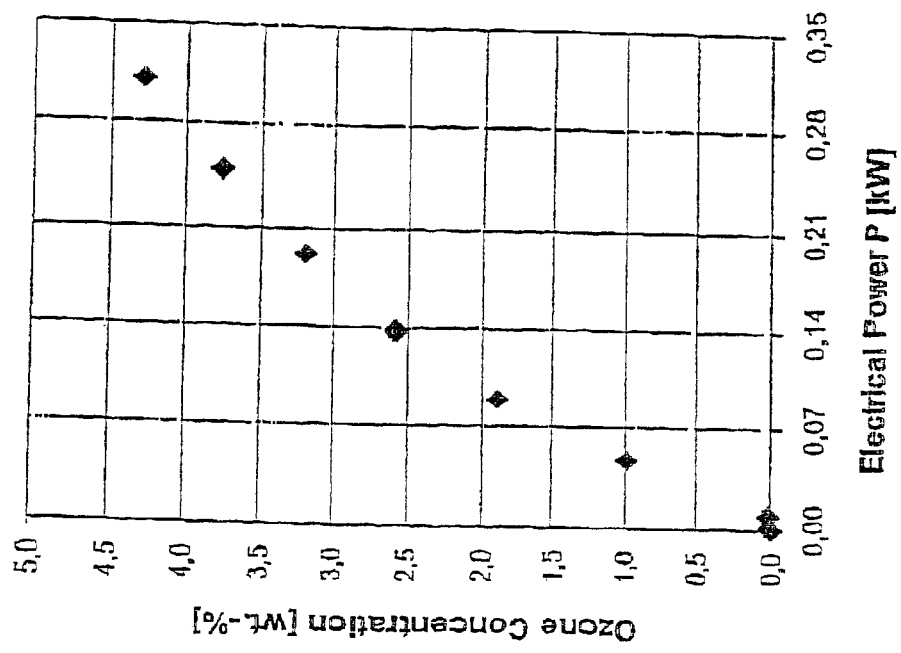
FIG. 5 shows a graphic representation of the ozone concentration, as a function of electrical output, that results with an ozonizer according to the present invention, having a support element made of Duran glass and a ceramic dielectric film made of zirconium oxide stabilized with yttrium oxide.

FIG. 5 shows the ozone concentration of the ozonizer according to the present invention, in accordance with FIG. 3, that can be achieved as a function of electrical output when using pure oxygen as the carrier gas.

Figure 4:
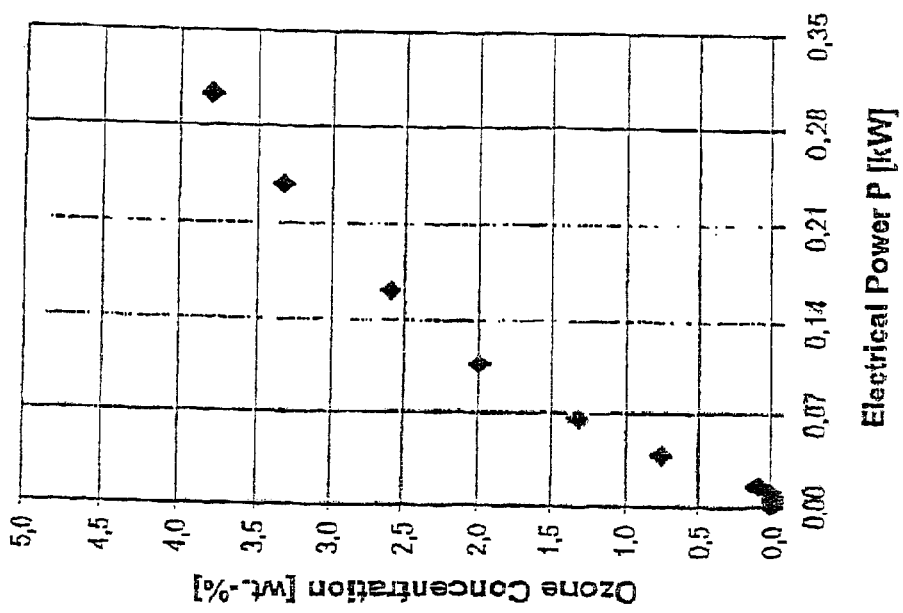
FIG. 4 shows a graphic representation of the ozone concentration, as a function of electrical output, that results with a conventional ozonizer according to FIG. 2.

A comparison with FIG. 4, which shows the corresponding ozone concentration as a function of electrical output of the ozonizer explained above with reference to FIG. 2, indicates that the ozone concentration can be increased by approximately 10% as compared to the conventional ozonizer.

For comparison, FIGS. 6 and 7 depict the corresponding curves for ozone yield and ozone concentration, as a function of delivered electrical output, obtained with a different conventional ozonizer, in which a glass tube is used solely as a support element and has applied on its outer side by plasma spraying a first electrode on which a dielectric film with a thickness of approximately 1 mm, comprising aluminum oxide and 6 wt % titanium oxide, is applied by plasma spraying. In this ozonizer the glass tube thus serves solely as a support element, and not as a dielectric.

A comparison between FIG. 6 and the ozonizer according to the present invention in accordance with FIG. 3 shows that the conventional ozonizer allows a slightly improved yield. A comparison of FIGS. 5 and 7 shows, however, that a greatly improved ozone concentration can be obtained with the ozonizer according to the present invention as compared to the conventional ozonizer.

What is claimed is:

1. An ozonizer comprising:
   a first electrode;
   a second electrode;
   a discharge gap formed between said first and second electrodes;
   a dielectic arranged between said first and second electrodes, said dielectric comprising a support element made of a material selected from the group consisting of glass and a glass ceramic, and a thermally sprayed ceramic dielectric film applied onto said support element, the ceramic film comprising at least one component selected from the group consisting of aluminum oxide, titanium oxide and zirconium oxide, said zirconium oxide being stabilized wit a component selected from the group consisting of $Y_2O_3$, MgO and CaO.

2. The ozonizer as defined in claim 1, wherein the ceramic film comprises zirconium oxide that is stabilized with up to 28 wt % MgO.

3. The ozonizer as defined in claim 1, wherein the ceramic film comprises zirconium oxide that is stabilized with up to 40 wt % CaO.

4. The ozonizer as defined in claim 3, wherein the first electrode is made of an aluminum alloy that contains up to approximately 30 wt % silicon.

5. An ozonizer comprising:

a first electrode;

a second electrode;

a discharge gap formed between said first and second electrodes;

a dielectric arranged between said first and second electrodes, said dielectric comprising a support element made of a material selected from the group consisting of glass and a glass ceramic, and a thermally sprayed ceramic dielectric film applied onto said support element, said dielectric film having a thickness of approximately 20 to 70 $\mu$m.

6. The ozonizer as defined in claim 5, wherein the ceramic film comprises at least one component selected from the group consisting of aluminum oxide, titanium oxide and zirconium oxide.

7. The ozonizer as defined in claim 6, wherein the ceramic film contains a mixture of titanium oxide and aluminum oxide which has up to approximately 10 wt % titanium oxide.

8. The ozonizer as defined in claim 6, wherein the ceramic film comprises zirconium oxide that is stabilized with a component selected from the group consisting of $Y_2O_3$, MgO and CaO.

9. The ozonizer as defined in claim 6, wherein the first electrode is made of a component selected from the group consisting of aluminum, an aluminum alloy, titanium, a titanium alloy, and an intermetallic compound of aluminum with nickel or titanium.

10. The ozonizer as defined in claim 9, wherein the first electrode is made of an aluminum alloy that contains up to approximately 30 wt % silicon.

11. The ozonizer as defined in claim 9, wherein the support element is made of borosilicate glass.

12. The ozonizer as defined in claim 9, wherein the support element is made of a glass ceramic.

* * * * *